United States Patent
Huang et al.

(10) Patent No.: US 11,372,750 B2
(45) Date of Patent: Jun. 28, 2022

(54) TEST SCRIPT FOR APPLICATION UNDER TEST HAVING ABSTRACTED ACTION GROUP INSTANTIATIONS

(71) Applicant: MICRO FOCUS LLC, Santa Clara, CA (US)

(72) Inventors: Dong-Xing Huang, Shanghai (CN); Rui Ma, Shanghai (CN); Zhen-Bin Lin, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 5 days.

(21) Appl. No.: 17/038,315

(22) Filed: Sep. 30, 2020

(65) Prior Publication Data

US 2022/0100646 A1    Mar. 31, 2022

(51) Int. Cl.
| | |
|---|---|
| G06F 9/44 | (2018.01) |
| G06F 11/36 | (2006.01) |
| G06N 20/00 | (2019.01) |
| G06F 9/451 | (2018.01) |
| G06F 40/205 | (2020.01) |
| G06F 11/34 | (2006.01) |

(52) U.S. Cl.
CPC .......... *G06F 11/3688* (2013.01); *G06F 9/451* (2018.02); *G06F 11/3414* (2013.01); *G06F 11/3692* (2013.01); *G06F 40/205* (2020.01); *G06N 20/00* (2019.01)

(58) Field of Classification Search
CPC .... G06F 11/3688; G06F 9/451; G06F 40/205; G06F 11/3414; G06F 11/3692; G06N 20/00
See application file for complete search history.

(56) References Cited

U.S. PATENT DOCUMENTS

| | | | |
|---|---|---|---|
| 6,360,332 B1 * | 3/2002 | Weinberg ............ | G06F 11/3664 714/E11.208 |
| 8,271,950 B2 | 9/2012 | Bharadwaj | |
| 8,826,084 B1 | 9/2014 | Gauf et al. | |

(Continued)

OTHER PUBLICATIONS

Automated Recording, Powerful Test Recording, accessed Jun. 26, 2020 <https://www.inflectra.com/rapise/highlights/automated-recording.aspx>.

(Continued)

*Primary Examiner* — Hang Pan

(57) ABSTRACT

Features of each ordered step of a recorded test script for an application under test (AUT) are generated. The ordered steps are segmentally organized over actions based on feature relatedness of the ordered steps. Each action includes a contiguous subset of the ordered steps. The actions are hierarchically organized within a tree based on an ordered feature relatedness of the actions. The tree has nodes respectively corresponding to the actions. The actions are abstractedly related to one another based on an unordered feature relatedness of the actions to generate abstracted actions that each generalize a subset of the actions. Abstracted action groups are generated based on the abstracted actions and the tree. Each abstracted action group includes abstracted actions mapping to corresponding nodes of the tree within a same branch. The ordered steps of the recorded test script are collapsed into a series of instantiations of the abstracted action groups.

20 Claims, 16 Drawing Sheets

(56) References Cited

U.S. PATENT DOCUMENTS

| | | | |
|---|---|---|---|
| 9,053,238 B2 | 6/2015 | Krishnan et al. | |
| 2005/0268285 A1* | 12/2005 | Bagley | G06F 11/3688 717/124 |
| 2009/0199096 A1 | 8/2009 | Pop-Jordanov et al. | |
| 2011/0004868 A1* | 1/2011 | Bharadwaj | G06F 11/3676 717/124 |
| 2014/0215439 A1* | 7/2014 | Krishnan | G06F 11/3688 717/124 |
| 2016/0321170 A1* | 11/2016 | Ellis | G06F 3/0482 |
| 2020/0174917 A1 | 6/2020 | Patel et al. | |

OTHER PUBLICATIONS

LoadRunner Creating Vuser Scripts, Version 7.8, Mercury Interactive, 2003 <https://softwaresupport.softwaregrp.com/doc/KM6527?fileName=hp_man_LR-version7.8-db_pdf.pdf>.

"Web Load Testing", Web Application Testing, 2020, <http://www.appperfect.com/services/load-testing/web-load-testing.php>.

* cited by examiner

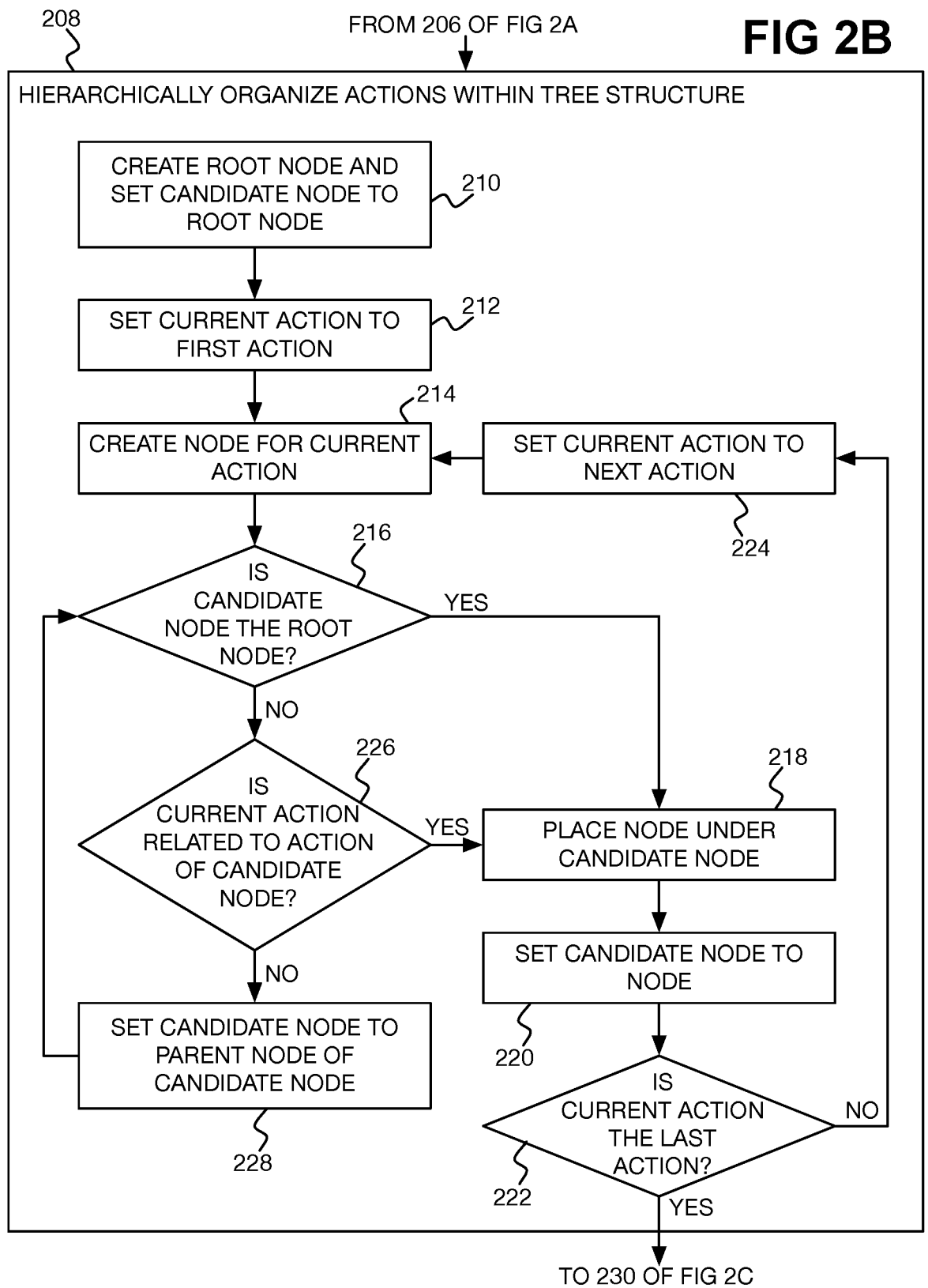

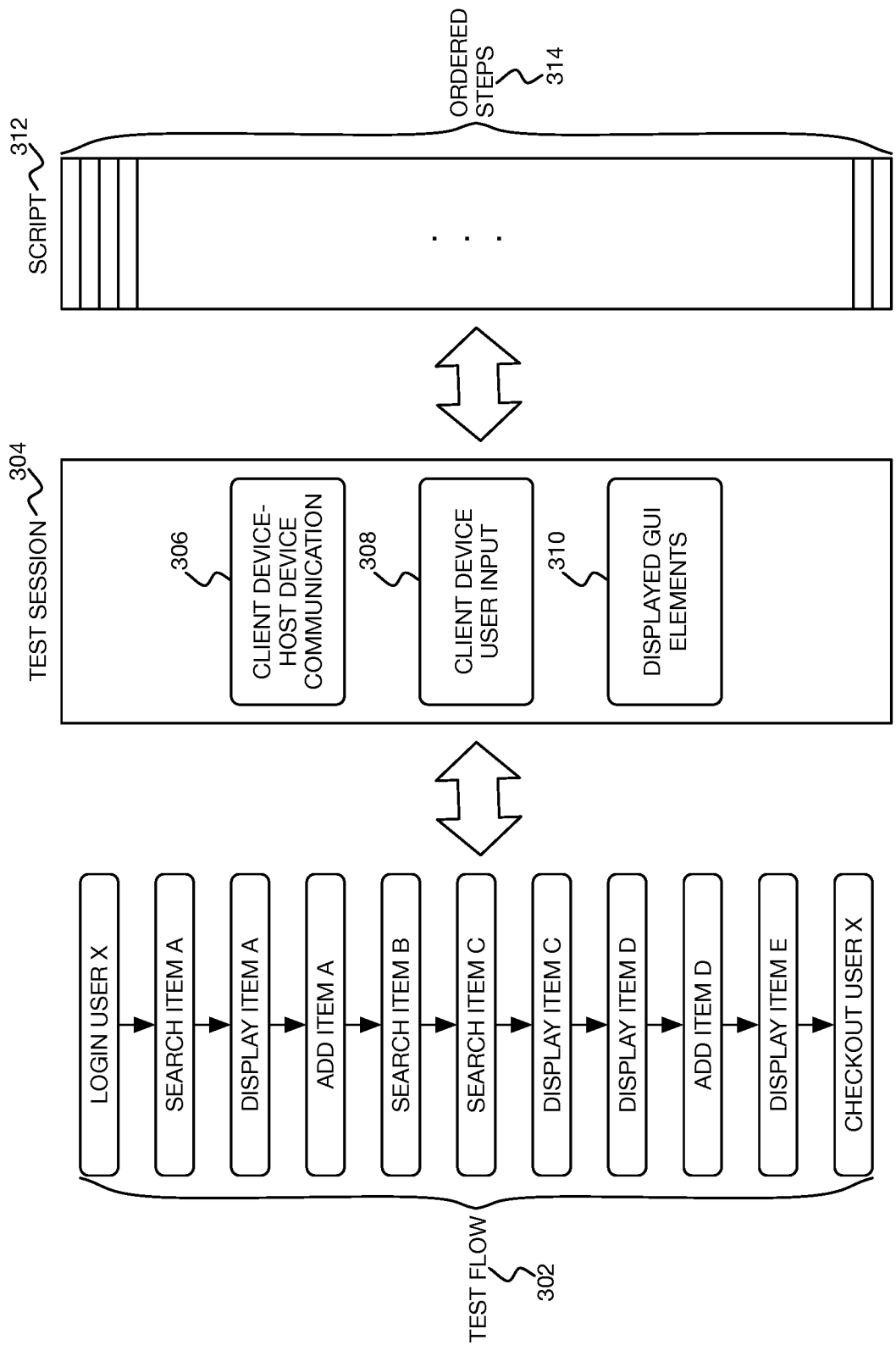

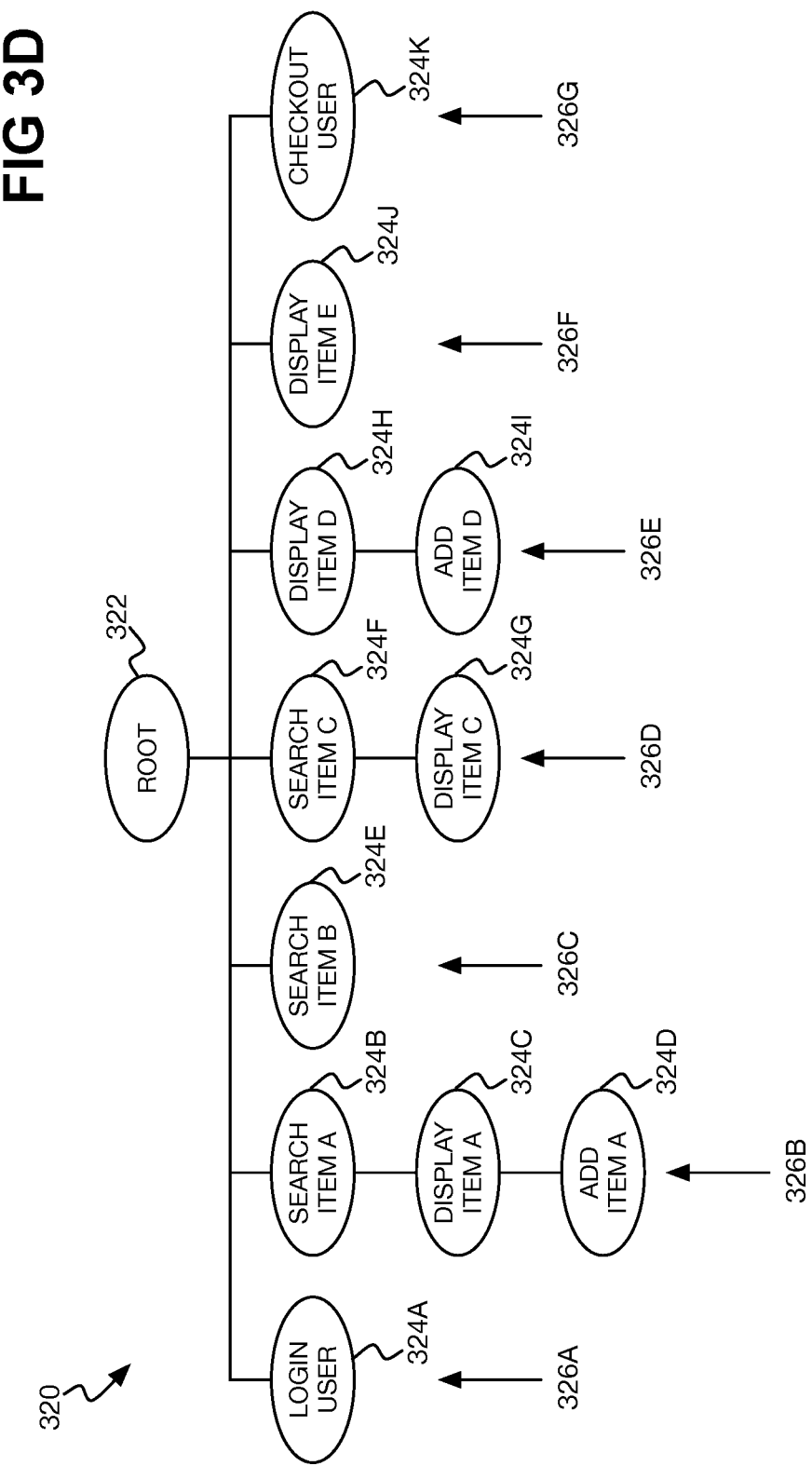

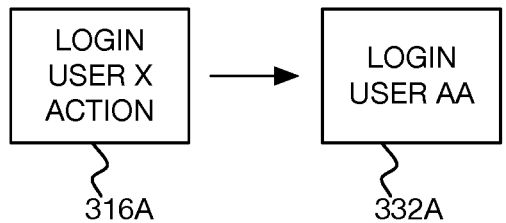
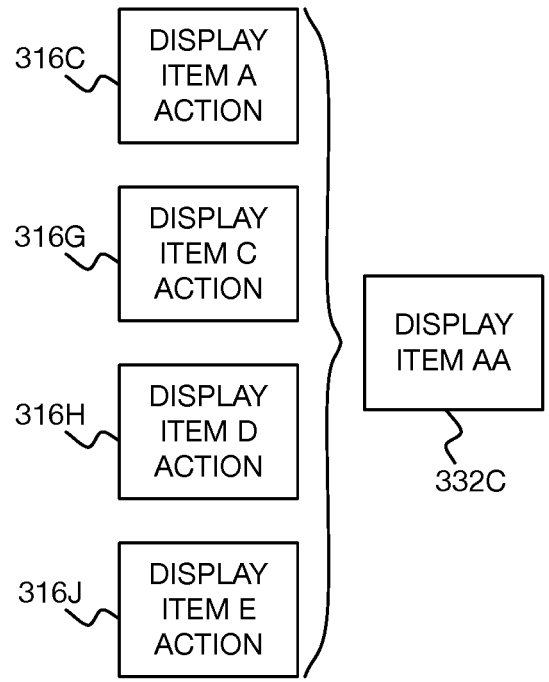
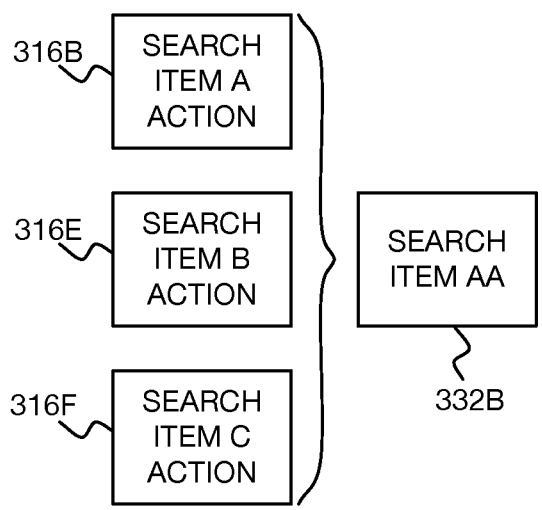
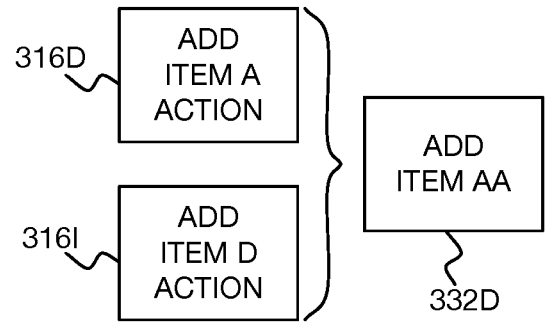
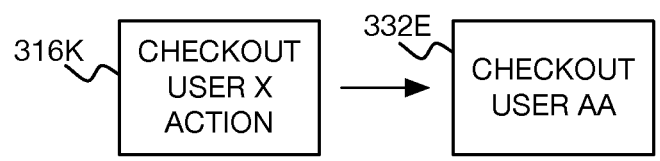

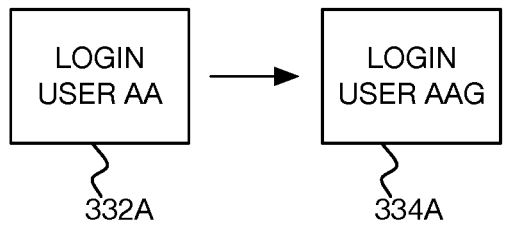
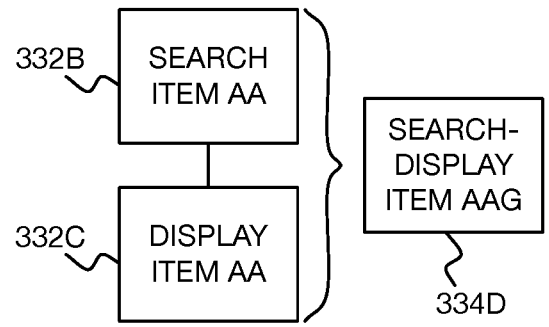
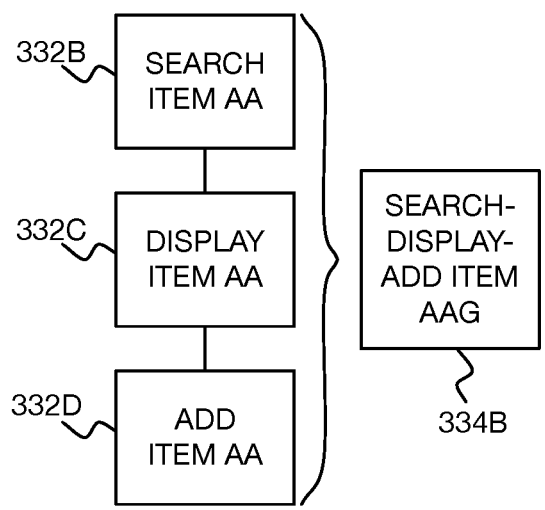
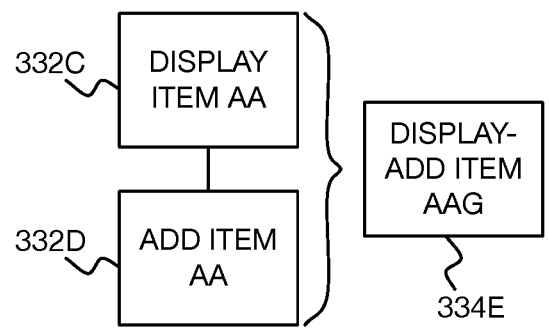
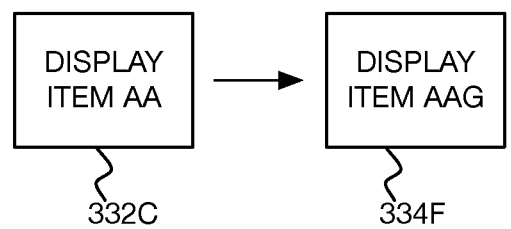
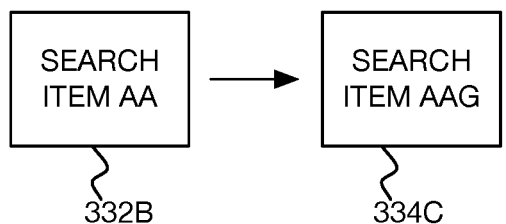
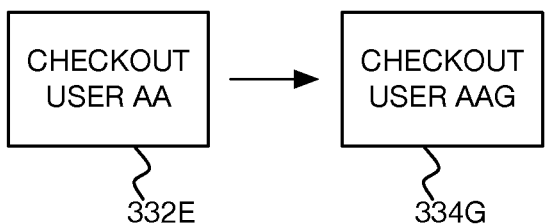

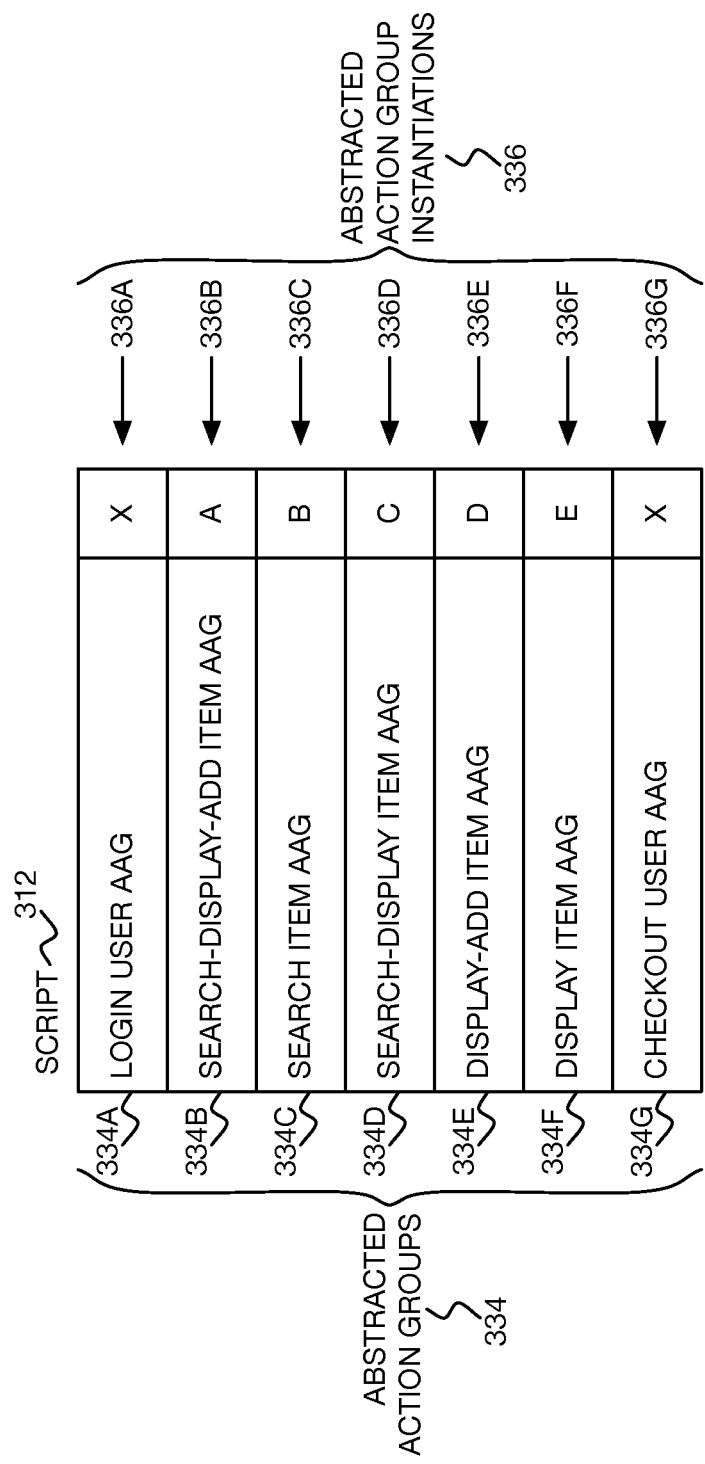

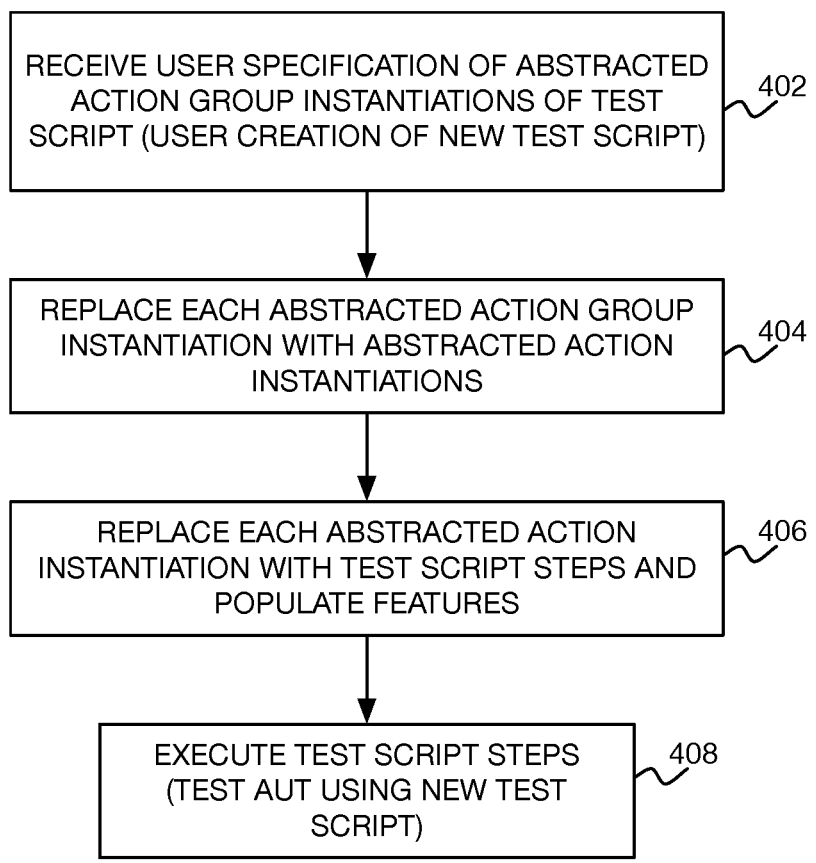

TEST SCRIPT FOR APPLICATION UNDER TEST HAVING ABSTRACTED ACTION GROUP INSTANTIATIONS

BACKGROUND

Computing devices like desktops, laptops, and other types of computers, as well as mobile computing devices like smartphones and tablet computing devices, among other types of computing devices, run software, which can be referred to as applications, to perform intended functionality. An application may be a so-called native application that runs on a computing device directly, or may be a web application or "app" at least partially run on a remote computing device accessible over a network, such as via a web browser running on a local computing device. To ensure that an application has been developed correctly to perform its intended functionality and that the application is operating correctly, the application may be tested.

BRIEF DESCRIPTION OF THE DRAWINGS

FIGS. 2A, 2B, and 2C are flowcharts of an example method for collapsing ordered steps of a recorded test script for an AUT into modifiable abstracted action group instantiations for subsequent AUT retesting.

FIGS. 3A, 3B, 3C, 3D, 3E, 3F, 3G, 3H, 3I, 3J, 3K, 3L, 3M, 3N, 3O, 3P, 3Q, and 3R are diagrams illustratively depicting example performance of the method of FIGS. 2A, 2B, and 2C.

FIG. 4 is a flowchart of an example method for testing an AUT using a test script of abstraction action group instantiations.

DETAILED DESCRIPTION

As noted in the background, an application is a computer program that is run, or executed, to perform intended functionality, and which may be tested to ensure that the application performs its intended functionality correctly. An application being tested may be referred to as an application under test (AUT). An AUT may expose a graphical user interface (GUI). During testing, different parts of the GUI can be actuated, or selected, in sequences to verify that the application operates as expected. These sequences may be referred to as test flows.

Application testing tools can generate, or record, a test script of ordered steps as a tester or other user is interacting with the GUI of the AUT in accordance with a test flow. The recorded test script can later be played back to retest the AUT using the same test flow. The application testing code can permit a user to modify the ordered steps of a test script to change how the AUT will be tested during playback of the script. However, in actuality, modifying the steps is difficult and fraught with peril: unless a user has a comprehensive understanding of the AUT, he or she may be unlikely to successfully modify the script.

Techniques described herein improve testing and debugging of an AUT by collapsing the ordered steps of a recorded test script into more easily understood and modifiable abstracted action group instantiations. The underlying complexity of the ordered steps can be hidden from the user. The user can modify an existing test script by changing associated features of the abstracted action group instantiations, for instance. The user can create a new test script by specifying instantiations of abstracted action groups in accordance with a desired test flow.

An abstracted action group instantiation is an instantiation of an abstracted action group as to specified features. An abstracted action group defines a series of abstracted actions. An abstracted action abstracts, or generalizes, actions. An action groups a series of ordered steps of a recorded test script by their features. Therefore, to instantiate an abstracted action group as to specified features, the group is replaced with its defined series of abstracted actions. Each abstracted action in turn is replaced with corresponding ordered steps, which are then populated with the specified features to instantiate the abstracted action as an action encompassing these feature-populated steps. The features of the steps, and thus the features of the actions, abstracted actions, and abstraction action groups, can include arguments and parameters of function calls, requests, and responses of the AUT to which the steps correspond.

Figure 1:
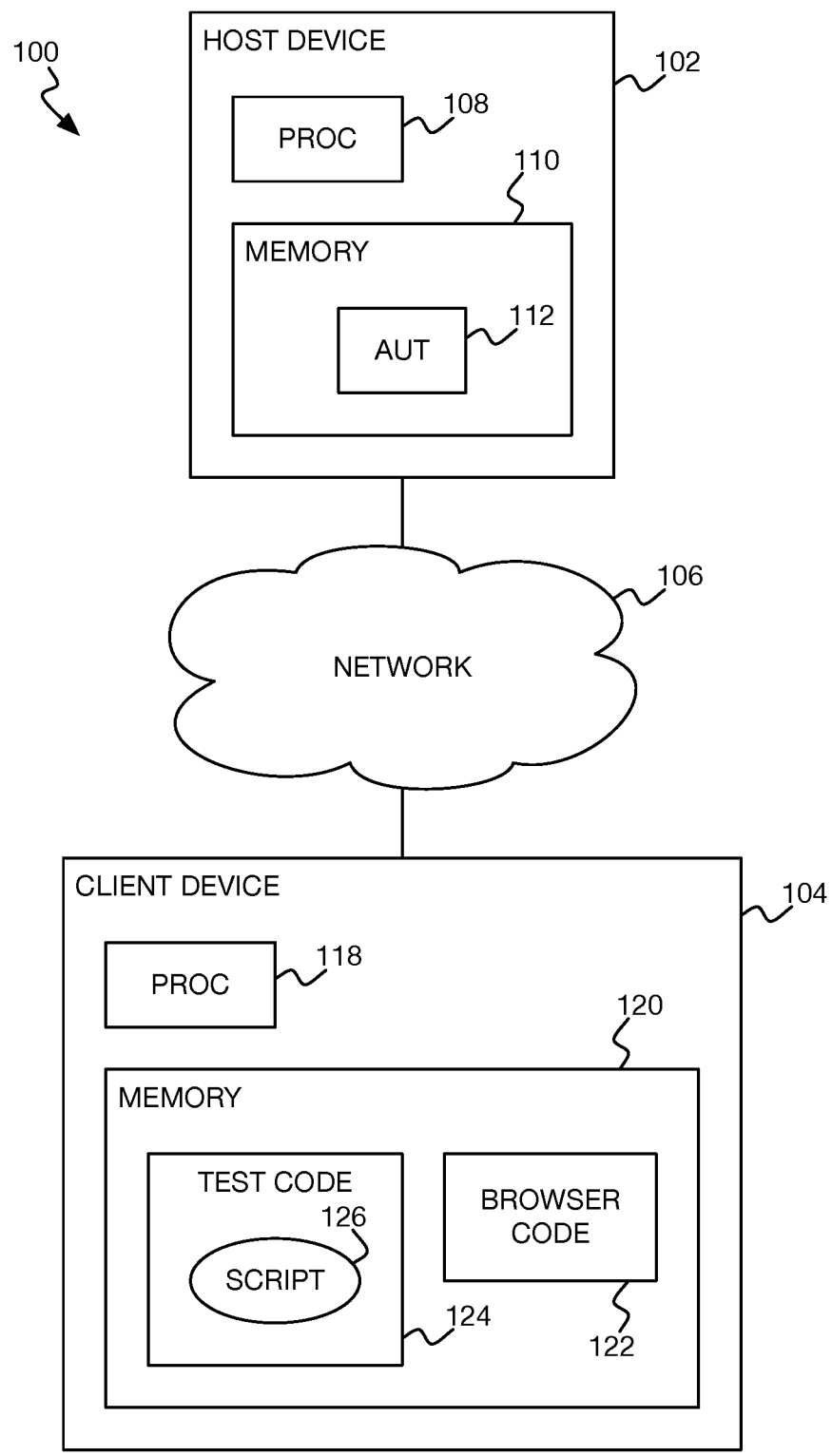
FIG. 1 is a diagram of an example system in which testing of an application under test (AUT) can occur.

FIG. 1 shows an example system 100 in which AUT testing can occur. The system 100 can include a host device 102 and a client device 104, which are communicatively connected to one another via a network 106. The host device 102 may be a server or another type of computing device. The client device 104 may be a desktop, laptop, or another type of computer, a mobile computing device like a smartphone or a tablet computing device, and so on. The network 106 may be or include the Internet, intranets, extranets, local-area networks, wide-area networks, wireless networks, wired networks, telephony networks, and so on.

The host device 102 includes a processor 108 and memory 110 storing an AUT 112 hosted by the device 102. The processor 108 of the host device 102 at least partially runs or executes the AUT 112. The client device 104 similarly includes a processor 118 and memory 120, which stores browser code 122 and test code 124. The processor 118 of the client device 104 executes the browser code 122 and the test code 124. In another implementation, the browser code 122 and the test code 124 may be executed on different devices.

A user at the client device 104 interacts with the GUI of the AUT 112 via the browser code 122. For example, the AUT 112 may transmit a web page formatted in accordance with a markup language to the browser code 122, which responsively renders and displays the web page. Selection of a hyperlink by a user at the browser code 122 is transmitted back to the AUT 112, which may then transmit another web page, and so on. The processor 118 of the client device 104 may also partially run the AUT 112.

The user thus tests the AUT 112 by interacting with the GUI of the AUT 112 over a series of interactions in accordance with a test flow. The test code 124 records, or generates, a test script 126 in correspondence with the test flow. Subsequent playback of the test script 126 by the test code 124 retests the AUT 112. The test script 126 can be played back in an automated manner, without user interaction or assistance.

During user interaction with the GUI of the AUT 112 in accordance with a test flow, the test code 124 can also record a test session. The test session can include communication resulting from interaction with the GUI of the AUT 112, such as user interaction via the browser code 122, which is transmitted from the client device 104 over the network 106 to the host device 102. Similarly, the test session can include responsive communication from the AUT 112 back to the browser code 122, which is transmitted from the host device 102 over the network 106 to the client device 104.

The test session can include other information. For example, the test session can include the GUI at each interaction, such as a screen capture thereof, a definition of the GUI in a markup language or in another manner, and so on. The test session can include information regarding how the user is interacting with the GUI, such as via a pointing device, a keyboard, and so on, information regarding where the GUI pointer is located in relation to the GUI during such interaction, and other information. The test code 124 can correspond the information of the test session with the ordered steps of the recorded test script 126.

Other implementations can differ from that shown in FIG. 1. The host device 102 and the client device 104 may be directly connected to one another, instead of via a network 106. The client device 104 may access the AUT 112 in a way other than by usage of browser code 122, such as via a native application or "app" running on the client device 104 that interacts with and can partially run the AUT 112. The host device 102 and the client device 104 may be the same computing device. In such an implementation, there may or may not be browser code 122. For example, the AUT 112 may display its GUI and directly receive user interaction with the GUI without usage of browser code 122.

Figure 2A:
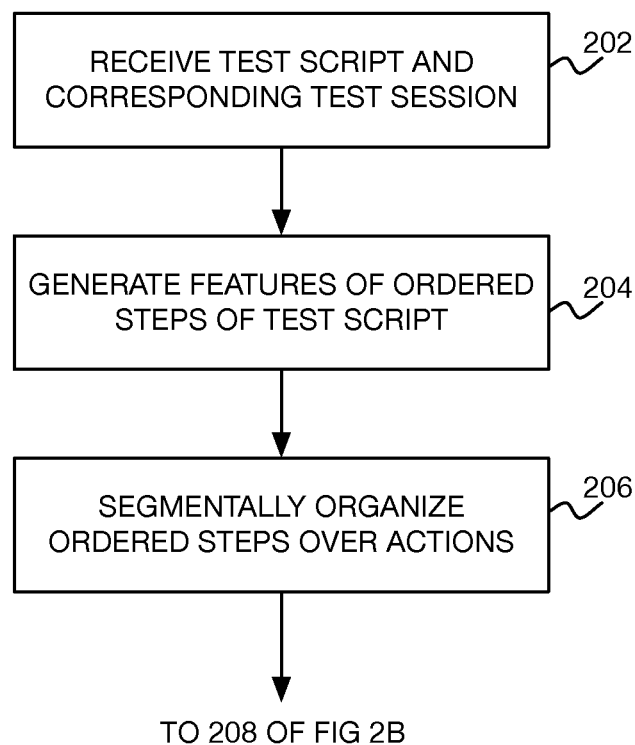
Figure 2C:
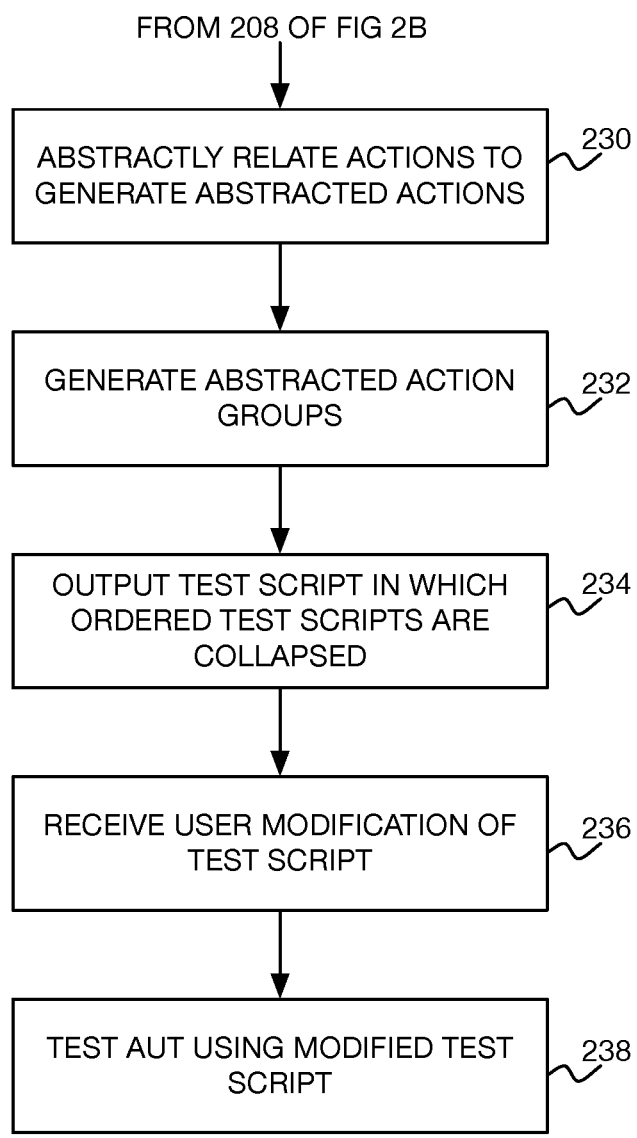

FIGS. 2A, 2B, and 2C show an example method for collapsing ordered steps of a recorded test script for an AUT into modifiable abstracted action group instantiations for subsequent AUT retesting. The method can be implemented as program code stored on a non-transitory computer-readable data storage medium, and executable by a processor of a computing device. A computing device can perform the method. For instance, with respect to the example system of FIG. 1, the computing device may be an additional computing device, different from the host device 102 and the client device 104. In another implementation, the computing device may be either or both of the devices 102 and 104, in lieu of or in addition to an additional device.

Referring first to FIG. 2A, the method includes receiving a recorded test script for an AUT and a test session corresponding to the test flow on which basis the test script was recorded (202). For instance, FIG. 3A shows a test flow 302 of the tested functionality of an electronic commerce ("e-commerce") AUT. Upon login of user X, the user searches for, causes display of, and adds item A to a shopping cart. The user may search for the item via a search box of a GUI exposed by the AUT, and select the item from a list of resultantly displayed items to cause display of details regarding the item within the same or different GUI of the AUT, before selecting a button or other GUI control to add the item to the shopping cart.

In the example, the user then searches for item B before searching for item C and causing display of details regarding item C. The AUT may, as part of the GUI in which the details regarding item C, provide a link to item D. The user may select item D to cause details regarding item D to be displayed, and then add item D to the shopping cart. The AUT may as part of the GUI in which confirmation of the addition of item D to the cart display a link to item E, which the user selects to cause display of details regarding item E before the user checks out to purchase items A and D that have been added to the shopping cart.

A test session 304 corresponding to such user interaction of the test flow 302 can include client device-host device communication 306, i.e., the communication between the client and host devices as the user is interacting with the AUT, as noted above. As also noted above, the test session 304 can include client device user input 308, i.e., information regarding the user input during interaction with the AUT. The test session 304 can include displayed GUI elements 310, i.e., the GUI of the AUT at each user interaction, as noted above, which can include the various GUI elements making up the GUI, such as text boxes, displayed text, images, controls like buttons, and so on.

A recorded test script 312 corresponding to the test flow 302 includes ordered steps 314 generated by an application testing tool, like the test code 124 of FIG. 1. Playback of the test script 312 results in automated retesting of the AUT in the same way in which the user tested the AUT during the test flow 302. The ordered steps 314 are user modifiable to change the test script 312 and thus how the AUT is tested during subsequent playback of the (modified) test script 312, but in actuality unless a user is very knowledgeable regarding the AUT such modification is difficult, as noted above.

Figure 3B:
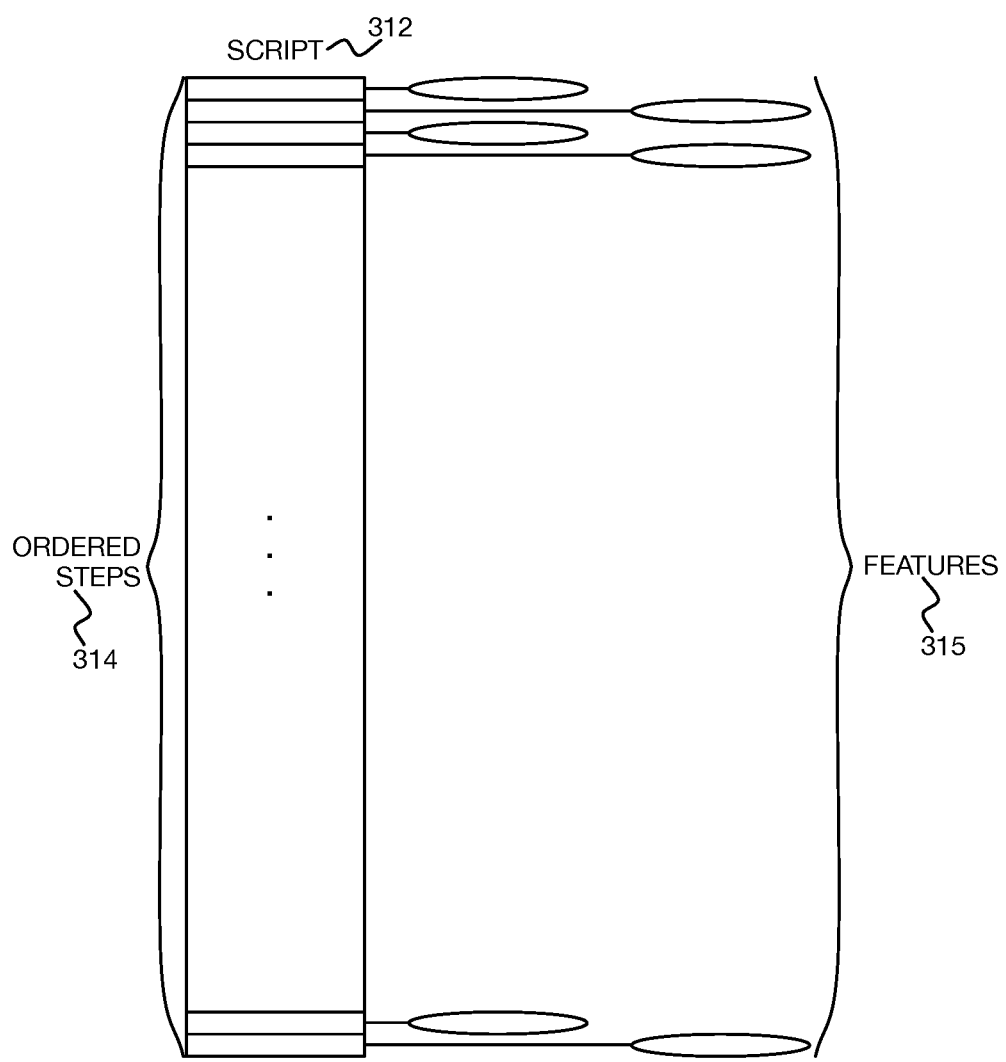

Referring back to FIG. 2A, the method includes generating features of the ordered steps of the test script (204). The features of the steps, and thus the features of the actions, abstracted actions, and abstraction action groups, can include arguments and parameters of function calls, requests, and responses of the AUT to which the steps correspond, as noted above. For instance, FIG. 3B shows generated features 315 for the ordered steps 314 of the test script 312. Each step 314 includes one or multiple features 315.

The features for each step can be generated in one or more of a number of different ways. For example, the features of the ordered steps can be generated by applying a natural language processing (NLP) technique to each step to extract the arguments and parameters of function calls, requests, responses, and other features of the step. As a second example, the features of the ordered steps can be generated by applying a machine learning technique to each step or to the GUI elements as to which the step is operative, with the machine learning technique correspondingly outputting the features of the step. As a third example, the features of the ordered steps can be generated by applying a pattern recognition technique to the user input corresponding to each step when the recorded test script was recorded (e.g., during the test flow) to extract the features of the step.

Referring back to FIG. 2A, the method includes segmentally organizing the ordered steps of the test script over actions (206). The steps can be segmentally organized based on the feature relatedness of the steps. Each action includes a contiguous subset of the steps, and each step is part of one action. The feature relatedness of the steps specifies an extent to which their features are related to one another. The steps can be organized into actions such that the feature relatedness of the steps of each action is greater than a threshold feature relatedness. The steps are said to be segmentally organized over the actions in that the boundaries between adjacent ordered steps belonging to different actions may be effectively or in actuality determined to segment the steps of the script into the actions.

Figure 3C:
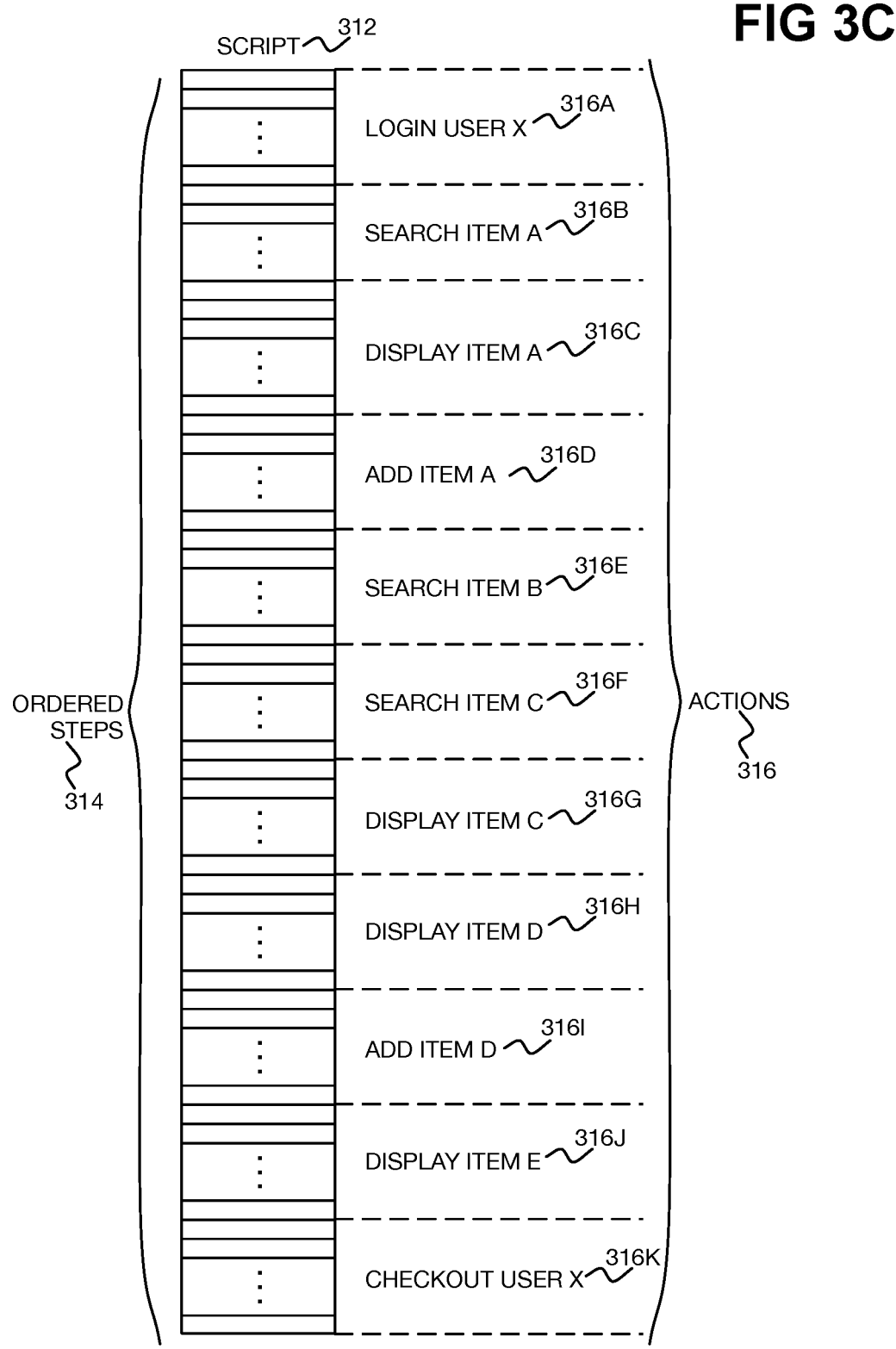

For instance, FIG. 3C shows the ordered steps 314 of the test script 312 segmentally organized into actions 316. The actions 316 include a login user X action 316A including the contiguous steps 314 performed to login user X. The actions 316 include an adjacent search item A action 316B including the contiguous steps 314 performed to search for item A, an adjacent display item A action 316C including the contiguous steps performed to display details regarding item A, and an adjacent add item A action 316D including the contiguous steps 314 perform to add item A to the cart.

The actions 316 include an adjacent search item B action 316E including the contiguous steps 314 performed to search for item B, an adjacent search item C action 316F including the contiguous steps 314 performed to search for item C, and an adjacent display item C action 316G including the contiguous steps 314 performed to display details regarding item C. The actions 316 include an adjacent action 316H including the contiguous steps 314 performed to display details regarding item D, an adjacent action 316I including the contiguous steps 314 performed to add item D to the cart, and an adjacent action 316J including the contiguous steps 314 performed to display details regarding item E. The actions 316 include a checkout user X action 316K including the contiguous steps 314 performed to check out the shopping cart for user X.

The feature relatedness of the features of the ordered steps can be determined and the ordered steps then segmentally organized over actions in a number of different ways. As an example, a cosine or other similarity measure of the ordered steps can be determined from their features to determine the feature relatedness of these features. For instance, the similarity measure of each unique pair of adjacent ordered steps (i.e., the similarity measure of the features of one ordered step to the features of the other ordered step) may be determined. A first action is created that includes the initial step of the script, and the unique step pairs are then sequentially inspected. If the similarity measure of the second step of a pair to the first step of the pair is greater than a threshold, then the second step is part of the action of the first step. Otherwise, a new action is created beginning with the second step. This process is repeated until all unique pairs have been inspected.

As another example, the feature relatedness of the features of the ordered steps can be effectively determined and the ordered steps then segmentally organized over actions by applying a machine learning technique to the ordered steps based on their features. The machine learning technique can group the ordered steps over adjacent actions based on their feature relatedness. In this example, the feature relatedness of the features is not explicitly determined, but rather is considered within or intrinsically by the machine learning technique.

Referring next to FIG. 2B, method includes hierarchically organizes the actions within a tree structure (208). The tree structure includes nodes that respectively correspond to the actions of the script. Each action has one corresponding node. The actions can be organized hierarchically within a tree structure based on an ordered feature relatedness of the actions. The ordered feature relatedness of the actions specifies an extent to which the features of the ordered steps of the actions are related to one another, taking into account the order of the actions within the test script.

The actions can be hierarchically organized within a tree structure in one implementation as follows. A root node of the tree script is created, and a candidate node is set to the root node (210). A current action is set to the first action of the test script. A node is created for the current action (214), but not yet placed within the tree structure. In response to determining that the candidate node is the root node (216), then the node for the current action is placed as a child node under the candidate node (218), and the candidate node is set to the node for the current action (220). If the current action is not the last action within the test script (222), then the current action is set to the next action within the script (224), and the method repeated at part 214.

If the candidate node is not the root node (216), however, and in response to determining that the current action is related to the action of the candidate node (226), then the node for the current action is still placed as a child node under the candidate node (218). The candidate node is set to the node for the current action (220), as before. Also as before, if the current action is not the last action within the test script (222), then the current action is set to the next action within the script (224), and the method repeated at part 214.

The ordered feature relatedness of the current action and the action of the candidate node and whether these two actions are related to one another based on their ordered feature relatedness can be determined in a number of different ways. As an example, a cosine or other similarity measure of the two actions (i.e., the similarity measure of the features of the ordered steps of one action in relation to the features of the ordered steps of the other action) can be determined as the ordered feature relatedness of the two actions. The two actions can be considered as related if their ordered feature relatedness is greater than a threshold, for instance.

As another example, the ordered feature relatedness of the two actions can be effectively determined and whether the actions are related to one another based on their ordered feature relatedness can be determined by applying a machine learning technique to the actions based on the features of their ordered steps. The machine learning technique can output whether the two actions are related based on the ordered feature relatedness. In this example, the ordered feature relatedness is not explicitly determined, but rather is considered within or intrinsically by the machine learning technique.

Because the feature relatedness is determined between the current action and an action occurring within the recorded test script before the current action, the feature relatedness is an ordered feature relatedness. Stated another way, the ordered feature relatedness takes into account the order of the actions within the test script. That is, the action in relation to which the ordered feature relatedness for the current action is considered is a prior action, and not a subsequent action, within the test script.

If the candidate node is not the root node (216) and if the current action is not related to the action of the candidate node (226), though, then the candidate node is set to the parent node of the candidate node (228), and the method repeated at part 216. Once nodes for all the actions of the test script have been created and placed within the tree structure in the foregoing manner, the hierarchical organization of the actions within the tree structure is complete. That is, the method exits part 208 once the current action is the last action of the test script (222).

For instance, FIG. 3D shows a tree structure 320 that hierarchically organizes the actions 316 of the tree script 312 of FIG. 3C. A root node 322 is first created. A node 324A is created for the login user X action 316A, and placed under the root node 322. The ordered feature relatedness between the search item A action 316B and the login user X action 316A may be less than the threshold. This may be because the action 316B relates to an item (specifically item A), whereas the action 316A does not relate to an item. Therefore, a created node 324B for the action 316B is placed under the root node 322.

The ordered feature relatedness between the display item A action 316C and the search item A action 316B may be greater than the threshold. This may be because the actions 316B and 316C both relate to the same item A. Therefore, a created node 324C for the action 316C is placed under the node 324B for the action 316B. The ordered feature relatedness between the add item A action 316D and the display item A action 316C may likewise be greater than the threshold, and therefore a created node 324D for the action 316D is placed under the node 324C for the action 316C.

The ordered feature relatedness between the search item B action 316E and the add item A action 316D may be less than the threshold, as are the ordered feature relatedness between the action 316E and the display item A action 316C and the ordered featured relatedness between the action 316E and the search item A action 316B. This may be because the action 316E relates to the item B, whereas the actions 316D, 316C, and 316D relate to the item A. Therefore, a created node 324E for the action 316E is placed under the root node 322.

The ordered feature relatedness of the search item C action 316F and the search item B action 316E may also be less than the threshold, because the action 316F relates to a different item than the action 316E. Therefore, a created node 324F for the action 316F is likewise placed under the root node 322. The ordered feature relatedness of the display item C action 316G and the search item C action 316F may be greater than the threshold, because both actions 316F and 316G relate to the same action C. Therefore, a created node 324G for the action 316G placed under the node 324F for the action 316F.

The ordered feature relatedness of the display item D action 316H and the display item C action 316G may be less than the threshold, as is the ordered feature relatedness between the action 316H and the search item C action 316C. This may be because the action 316H relates to the item D, whereas the actions 316G and 316F relate to the item C. Therefore, a created node 324H for the action 316H is placed under the root node 322. The ordered feature relatedness of the add item D action 316I and the display item D action 316H may be greater than the threshold, because both actions 316H and 316I relate to the same action D. Therefore, a created node 324I for the action 316I is placed under the node 324H for the action 316H.

The ordered feature relatedness of the display item E action 316J and the add item D action 316I may be less than the threshold, because the action 316J relates to a different item than the action 316I. Therefore, a created node 324J for the action 316J is placed under the root node 322. The ordered feature relatedness of the checkout user X action 316K and the display item E action 316J may be less than the threshold, because the action 316J relates to an item (specifically item E), whereas the action 316K does not. Therefore, a created node 324K for the action 316K is placed under the root node 322.

The created tree structure 320 includes branches 326A, 326B, 326C, 326D, 326E, 326F, and 326G, which are collectively referred to as the branches 326. Each branch 326 includes one or more ordered nodes 324. For each branch 326 having more than one node 324, the ordered nodes 324 map to corresponding actions 316 are related based on their ordered feature relatedness. For example, the actions 316B, 316C, and 316D corresponding to the nodes 324B, 324C, and 324E are related based on their ordered feature relatedness. Likewise, the actions 316F and 316G corresponding to the nodes 324F and 324G are related based on their ordered feature relatedness, and the actions 316H and 316I corresponding to the nodes 324H and 324I are related based on their ordered feature relatedness.

Referring next to FIG. 2C, the method includes abstractly relating the actions to generate abstracted actions (230). Each abstracted action generalizes a subset of one or more of the actions as to their features. Each action is abstracted by one abstracted action. Stated another way, the actions abstracted by one abstracted action are not abstracted by any other abstracted action.

Actions of the same type correspond to (i.e., are abstracted as) as the same abstracted action. The actions can be abstracted based on an unordered feature relatedness of the actions. The unordered feature relatedness of the actions specifies an extent to which the features of the ordered steps of the actions are related to one another, not taking into account the order of the actions within the script.

The actions can be abstractly related to one another to generate the abstracted actions such that the unordered feature relatedness of the actions of each abstracted action is greater than a threshold feature relatedness. That is, a group of actions that are related to one another based on their unordered feature relatedness is abstracted as an abstracted action. An abstracted action does not include particular specification of features like an action. That is, an abstracted action is a featured-populated version of an action and thus which generalizes the action.

By comparison, an action is an instantiation of an abstracted action for particular features. An action can be instantiated from an abstracted action by populating the ordered steps of the abstracted action with features. The features are specified by the instantiation. For example, the features may pertain to or otherwise specify a particular user or item.

FIG. 3E shows that the login user X action 316A has been abstracted as the login user abstracted action 332A, which does not pertain to any particular user. The login user X action 316A is the only login user action (i.e., the only action of this action type) appearing in the test script. Instantiation of the abstracted action 332A as to the user X (i.e., as to the features specifying the user X) is or results in the action 316A.

FIG. 3F shows that the search item A action 316B, the search item B action 316E, and the search item C action 316F have been abstracted as the search item abstracted action 332B, which does not pertain to any particular item. The actions 316B, 316E, and 316F are related to one another because they are each a search item action and thus are of the same action type. Instantiation of the abstracted action 332B as to the items A, B, and C (i.e., as to the features specifying these items) respectively results in the actions 316B, 316E, and 316F.

FIG. 3G shows that the display item A action 316C, the display item C action 316G, the display item D action 316H, and the display item E action 316J have been abstracted as the display item abstracted action 332C. The actions 316C, 316G, 316H, and 316J are related to one another because they are each a display item action and thus are of the same action type. Instantiation of the abstracted action 332C as to the items A, C, D, and E (i.e., as to the features specifying these items) respectively results in the actions 316C, 316G, 316H, and 316J.

FIG. 3H shows that the add item A action 316D and the add item D action 316I have been abstracted as the add item abstracted action 332D. The actions 316D and 316I are related to one another because they are each an add item action and thus are of the same action type. Instantiation of the abstracted action 332D as to the items A and D (i.e., as to the features specifying these items) respectively results in the actions 316D and 316I.

FIG. 3I shows that the checkout user X action 316K has been abstracted as the checkout user abstracted action 332E. The action 316K is the only checkout user action (i.e., the only action of this action type) appearing in the test script.

Instantiation of the abstracted action 332E as to the user X (i.e., as to the features specifying the user X) results in the action 316K.

The unordered feature relatedness of the actions can be determined and the actions can be grouped into the abstracted actions in a number of different ways. For example, a cosine or other similarity measure of each pair of actions (i.e., the similarity measure of the features of the ordered steps of one action in relation to the features of the ordered steps of the other action) can be determined as the unordered feature relatedness of the two actions. An abstracted action can be generated for each group of actions for which the unordered feature relatedness of every unique pair of actions within the group is greater than a threshold, for instance.

As another example, the unordered feature relatedness of the actions can be effectively determined and the actions can be grouped into the abstracted actions by applying a machine learning technique to the actions based on the features of their ordered steps. The machine learning technique can output the abstracted actions and indicate which actions have been grouped into each abstracted action, based on the unordered feature relatedness. In this example, the unordered feature relatedness is not explicitly determined, but rather is considered within or intrinsically by the machine learning technique.

Because the feature relatedness of the actions and the actions abstracted into abstracted actions without considering the order in which the actions appear in the test script, the feature relatedness is an unordered feature relatedness. Stated another way, the unordered feature relatedness does not take into account the order of the actions within the test script. That is, actions can be grouped into the abstracted actions regardless of the order in which the actions appear in the test script.

Referring back to FIG. 2C, the method includes generating abstracted action groups from the abstracted actions (232). Each abstracted action can be part of one or more abstracted action groups. Each abstracted action group includes the abstracted action or abstracted actions mapping to corresponding nodes of the tree structure within the same branch of the tree structure. That is, there is an abstracted action group for each branch of the tree structure, and which includes the abstracted action or abstracted actions mapping to corresponding nodes within this branch.

Therefore, an abstracted action group is generated for the abstracted actions mapping to corresponding nodes of each branch of the tree structure. For instance, FIG. 3J shows that the login user abstracted action group 334A includes the abstracted action 332A mapping to the node 324A of the branch 326A of FIG. 3D. The abstracted action 332A maps to the node 324A because it abstracts the action 316A of FIG. 3C corresponding to the node 324A.

FIG. 3K shows that the search-display-add item abstracted action group 334B includes the abstracted actions 332B, 332C, and 332D mapping to the nodes 324B, 324C, and 324D of the branch 326B of FIG. 3D. The abstracted actions 332B, 332C, and 332D map to the nodes 324B, 324C, and 324D because they abstract the actions 316B, 316C, and 316D of FIG. 3C corresponding to the nodes 324B, 324C, and 324D. FIG. 3L shows that the search item abstracted action group 334C includes the abstracted action 332B mapping to the node 324E of the branch 326C of FIG. 3D. The abstracted action 332B maps to the node 324E because it abstracted the action 316E of FIG. 3C corresponding to the node 324E.

FIG. 3M shows that the search-display item abstracted action group 334D includes the abstracted actions 332B and 332C mapping to the nodes 324F and 324G of the branch 326D of FIG. 3D. The abstracted actions 332B and 332C map to the nodes 324F and 324G because they abstract the actions 316F and 316G of FIG. 3C corresponding to the nodes 324F and 324G. FIG. 3N shows that the display-add item abstracted action group 334E includes the abstracted actions 332C and 332D mapping to the nodes 324H and 324I of the branch 326E of FIG. 3D. The abstracted actions 332C and 332D map to the nodes 324H and 324I because they abstract the actions 316H and 316I of FIG. 3C corresponding to the nodes 324H and 324I.

FIG. 3O shows that the display item abstracted action group 334F includes the abstracted action 332C mapping to the node 324J of the branch 326F of FIG. 3D. The abstracted action 332C maps to the node 324J because it abstracts the action 316J of FIG. 3C corresponding to the node 324J. FIG. 3P shows that the checkout user abstracted action group 334G includes the abstracted action 332E mapping to the node 324K of the branch 326G of FIG. 3D. The abstracted action 332E maps to the node 324K because it abstracts the action 316K of FIG. 3C corresponding to the node 324K.

Referring back to FIG. 2C, the method includes outputting the recorded test script for the AUT, such that the ordered steps of the script are collapsed into a series of instantiations of the abstracted action groups (234). The complexity of the ordered steps of the script can thus be hidden from the user. The script is therefore more comprehensible to the user.

The ordered steps of the script can be collapsed into instantiations of abstracted action groups by first replacing the actions into which the steps have been organized with instantiations of corresponding abstracted actions. Groups of the abstracted action instantiations can then be replaced with instantiations of the corresponding abstracted action groups. The abstracted action instantiations can be grouped by proceeding top-down through the script and replacing series of the instantiations with largest matching abstracted instantiation groups until all the abstracted action instantiations have been replaced.

For instance, FIG. 3Q shows the test script 312 in which the ordered steps 314 of FIG. 3C have been collapsed into instantiations 336 of the abstracted action groups 334. Specifically, the login user X action 316A of FIG. 3C is replaced within an instantiation of the abstracted login user action 332A of FIG. 3E as to the user X, which in turn is replaced with an instantiation 336A of the abstracted login user action group 334A as to the user X in FIG. 3Q.

The search item A action 316B, the display item A action 316C, and the add item A action 316D of FIG. 3C are replaced with instantiations of the search item abstracted action 332B of FIG. 3F, the display item abstracted action 332C of FIG. 3G, and the add item abstracted action 332D, respectively, as to the item A. These instantiations of the abstracted actions 332B, 332C, and 332D are in turn replaced with an instantiation 336B of the search-display-add item abstracted action group 334B as to the item A in FIG. 3Q. The instantiations of the abstracted actions 332B and 332C are not replaced with an instantiation of the search-display item abstracted action group 334E (of FIG. 3N). This is because there is a larger abstracted action group—the search-display-add item abstracted action group 334B—that includes the abstracted actions 332B and 332C as well as the next abstracted action 332D.

The search item B action 316E of FIG. 3C is replaced with an instantiation of the search item abstracted action 332B of FIG. 3F as to the item B, which in turn is replaced with an instantiation 336C of the search item abstracted action group 334C as to the item B in FIG. 3Q. The search item C action 316F and the display item C action 316G of FIG. 3C are replaced with instantiations of the search item abstracted action 332B of FIG. 3F and the display item abstracted action 332C of FIG. 3G, respectively, as to the item C. These instantiations of the abstracted actions 332B and 332C are in turn replaced with an instantiation 336D of the search-display abstracted action group 334D as to the item C in FIG. 3Q.

The display item D action 316H and the add item D action 316I of FIG. 3C are replaced with instantiations of the display item abstracted action 332C of FIG. 3G and the add item abstracted action 332D of FIG. 3H, respectively, as to the item D. These instantiations of the abstracted actions 332C and 332D are in turn replaced with an instantiation 336E of the display-add item abstracted action group 334E of FIG. 3N as to the item D in FIG. 3Q.

The display item E action 316J of FIG. 3C is replaced with an instantiation of the display item abstracted action 332C of FIG. 3G as to the item E, which is in turn replaced with an instantiation 336F of the display item abstracted action group 334F as to the item E in FIG. 3Q. Finally, the checkout user X action 316K of FIG. 3C is replaced with an instantiation of the checkout user abstracted action 332E of FIG. 3I as to the user X, which in turn is replaced with an instantiation 336G of the checkout user abstracted action group 334G in FIG. 3Q.

Referring back to FIG. 2C, the method can include receiving user modification of the test script that has been displayed with its ordered steps replaced by instantiations of abstracted action groups (236). For instance, the user may change which features the abstracted action group instantiations relate to (e.g., for a different user or a different item in the ongoing example). The user may reorder the abstracted action group instantiations, delete existing abstracted action group instantiations, and/or add new abstracted action group instantiations. The user can, in other words, modify the test script at the abstracted action group level, without direct user modification of the ordered steps of the script. The method can include then testing the AUT using the test script as has been modified (238). How an AUT can be tested using a test script specified in terms of abstracted action group instantiations instead of ordered steps is described later in the detailed description.

Figure 3R:
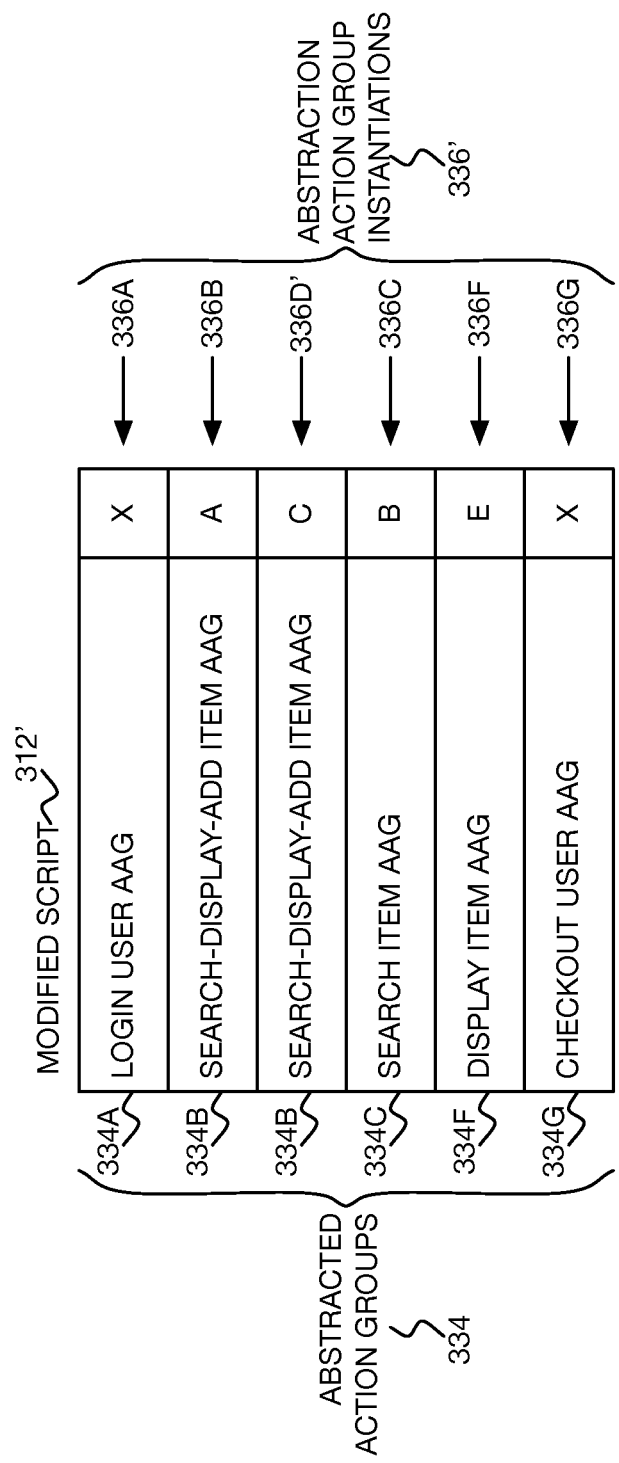

FIG. 3R shows an example modified test script 312', which is a modification of the test script 312 of FIG. 3Q. The modified test script 312' includes modified instantiations 336' of the abstracted action groups 334, which are modifications of the abstracted action group instantiations 336. The instantiation 336C of the search item abstracted action group 334C as to the item B has been moved down in the test script 312' so that it immediately precedes the instantiation 336F of the display item abstracted action group 334F, and the search-display abstracted action group instantiation 336D of FIG. 3Q has been deleted in the script 312'.

The instantiation 336D of the search-display item abstracted action group 334D has been modified as the instantiation 336D' of the search-display-add item abstracted action group 334C in the modified test script 312'. The instantiations 336A and 336B of the abstracted action groups 334A and 334B, respectively, have not been modified in FIG. 3R. Likewise, the instantiations 336F and 336G of the abstracted action groups 334F and 334G, respectively, have not been modified in FIG. 3R.

FIG. 4 shows an example method for testing an AUT using a test script specified in terms of abstracted action group instantiations. The method can be implemented as program code stored on a non-transitory computer-readable data storage medium, and executable by a processor of a computing device. A computing device can perform the method. For instance, with respect to the example system of FIG. 1, the computing device may be an additional computing device, different from the host device 102 and the client device 104. In another implementation, the computing device may be either or both of the devices 102 and 104, in lieu of or in addition to an additional device.

The method includes receiving user specification of abstracted action group instantiations of a test script for an AUT (402). Each abstracted action group instantiation of the test script corresponds to an abstracted action group. A user can, for instance, create a new test script for an AUT at the abstracted action group instantiation level without direct user specification of the ordered steps of the new test script. The abstracted action groups may have been previously generated as has been described in relation to the method of FIGS. 2A, 2B, and 2C.

Figure 5A:
FIGS. 5A, 5B, and 5C are diagrams illustratively depicting example performance of the method of FIG. 4.

For instance, FIG. 5A shows a new test script 512 for the same AUT to which the test script 312 of FIG. 3A pertains. The test script 512 is specified in terms of instantiations 536 of the abstracted action groups 334. Specifically, the test script 512 includes an instantiation 536A of the login user abstracted action group 334A as to the user Y. The test script 512 includes an instantiation 536B of the display-add-item abstracted action group 334E as to the item F. The test script 512 includes an instantiation 536C of the checkout user abstracted action group 334G as to the user Y.

Referring back to FIG. 4, the method includes replacing each abstracted action group instantiation of the test script with abstracted action instantiations (404). Each abstracted action group instantiation is an instantiation of a corresponding abstracted action group of abstracted actions. A abstracted action group instantiation is thus replaced in the test script with corresponding instantiations of these abstracted actions. Each abstracted action instantiation corresponds to an abstracted action.

Figure 5B:
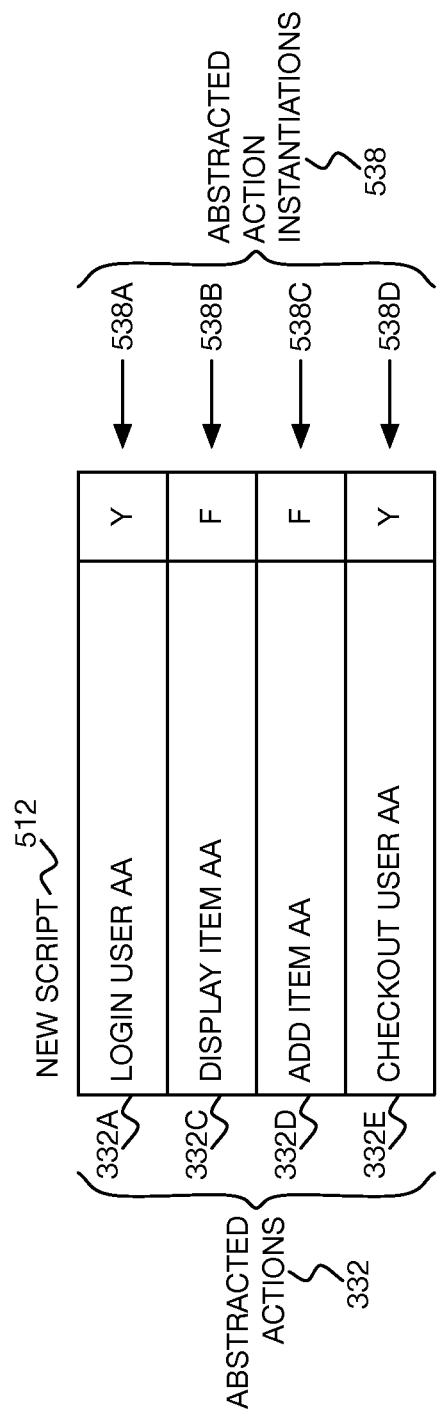

For instance, FIG. 5B shows the new test script 512 in which the instantiations 536 of the abstracted action groups 334 have been replaced with instantiations 538 of the abstracted actions 332. Specifically, the instantiation 536A of the login user abstracted action group 334A as to the user Y has been replaced with the instantiation 538A of the login user abstracted action 332A as to the user Y.

The instantiation 536B of the display-add item abstracted action group 334E as to the item F has been replaced with the instantiations 538B and 538C of the display item abstracted action 332C and the add item abstracted action 332D, respectively, as to the item F. The instantiation 536C of the checkout user abstracted action group 334G as to the user Y has been replaced with the instantiation 538D of the checkout user abstracted action 332E as to the user Y.

Referring back to FIG. 4, the method includes replacing each abstracted action instantiation with test script steps encompassed by the abstracted action to which the abstracted action instantiation corresponds, and replacing the features of the test scripts in accordance with the abstracted action instantiation (406). Each abstracted action instantiation is an instantiation of a corresponding abstracted action. Instantiation of the abstracted action is an action as to particular features as specified by the instantiation. For example, instantiation of an abstracted action as to a particular user or item specified by the instantiation is an action in which the ordered steps of the action are populated with features pertaining to or otherwise specifying this user or item.

Figure 5C:
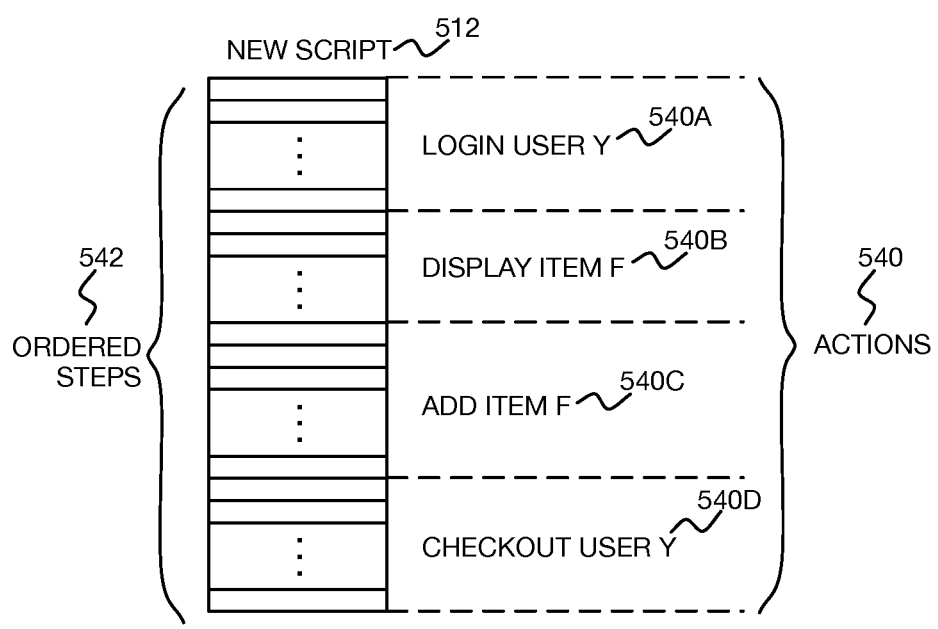

For instance, FIG. 5C shows the new test script 512 having actions 540 of ordered steps 542. The abstracted action instantiations 538 of the abstracted actions 332 have been replaced with abstracted actions 332 populated with features specified by the instantiations to generate the actions 540. The actions 540 thus include corresponding feature-populated ordered steps 542.

Specifically, the abstracted action instantiation 538A has been replaced with the abstracted action 332A populated with features for the user Y to generate the login user Y action 540A. The abstracted action instantiations 538B and 538C have been replaced with the abstracted actions 332C and 332D populated with features for the item F to generate the display item F and add item F actions 540B and 540C. The abstracted action instantiation 538D has been replaced with the abstracted action 332E populated with features for the user Y to generate the checkout user Y action 540D.

Referring back to FIG. 4, the method includes then executing the resulting test script to test the AUT (408). That is, the AUT can be tested using the new test script that was originally specified in terms of abstracted action group instantiations and that is now specified in terms of ordered steps (organized over actions). The test script can be executed via automated playback of its ordered steps in relation to the AUT.

For instance, the ordered steps 540 of the test script 512 of FIG. 5C, which was originally specified in terms of the instantiations 536 of abstracted action groups 334 in FIG. 5A, can be played back to test the AUT. The user who created the test script 512 did not have to directly input or otherwise specify or indicate the ordered steps 540. Rather, the user just had to directly input or otherwise specify or indicate the abstracted action group instantiations 536. The ordered steps 540 were then generated from the instantiations 536 as has been described.

Techniques have been described for testing and debugging an AUT via test scripts specified in more easily understood and modified abstracted action group instantiations. Users who may not have a level of familiarity of the AUT to specify the ordered steps of a test script to test the AUT may nevertheless be able to create or modify the test script at the abstracted group instantiation level. Therefore, such test scripts can be more easily created and modified.

We claim:

1. A non-transitory computer-readable data storage medium storing program code executable by a processor to perform processing comprising:
   generating a plurality of features of each of a plurality of ordered steps of a recorded test script for an application under test (AUT);
   segmentally organizing the ordered steps of the recorded test script over a plurality of actions, based on feature relatedness of the ordered steps;
   hierarchically organizing the actions within a tree structure, based on an ordered feature relatedness of the actions, the tree structure having a plurality of nodes respectively corresponding to the actions;
   abstractedly relating the actions to one another, based on an unordered feature relatedness of the actions, to generate a plurality of abstracted actions that each generalize a subset of the actions as to the features;
   generating a plurality of abstracted action groups, based on the abstracted actions, each abstracted action group comprising one or more abstracted actions mapping to corresponding nodes of the tree structure within a same branch; and
   outputting the recorded test script for the AUT such that the ordered steps are collapsed into a series of instantiations of the abstracted action groups.

2. The non-transitory computer-readable data storage medium of claim 1, wherein the processing further comprises:
   receiving user modification of the recorded test script for the AUT at an abstracted action group instantiation level without direct user modification of the ordered steps of the recorded test script; and
   testing the AUT in accordance with the recorded test script as has been modified.

3. The non-transitory computer-readable data storage medium of claim 2, wherein the processing further comprises:
   receiving user creation of a new test script for the AUT at an abstracted action group instantiation level without direct user specification of ordered steps of the new test script; and
   testing the AUT in accordance with the new test script as has been created.

4. The non-transitory computer-readable data storage medium of claim 1, wherein the feature relatedness of the ordered steps specifies an extent to which the features of the ordered steps are related to one another,
   and wherein the feature relatedness of the ordered steps of each action is greater than a threshold feature relatedness.

5. The non-transitory computer-readable data storage medium of claim 4, wherein the ordered steps of the recorded test script are segmentally organized over the actions in that boundaries between adjacent ordered steps belonging to different actions are determined to segment the ordered steps of the recorded test script into the actions.

6. The non-transitory computer-readable data storage medium of claim 1, wherein the ordered feature relatedness of the actions specifies an extent to which the features of the ordered steps of the actions are related to one another, taking into account an order of the actions within the recorded test script.

7. The non-transitory computer-readable data storage medium of claim 6, wherein hierarchically organizing the actions within the tree structure comprises:
   creating a root node and setting a candidate node to the root node;
   repeating, for each action of the recorded test script in order:
      creating a node for the action;
      repeating, until the node has been placed under the candidate node within the tree structure:
         in response to determining that the candidate node is the root node, placing the node under the candidate node within the tree structure and set the candidate node to the node;
         in response to determining that the candidate node is not the root node and that the action is related to the action of the candidate node by more than a threshold, placing the node under the candidate node within the tree structure and set the candidate node to the node; and
         in response to determining that the candidate node is not the root node and that the action is not related to the action of the candidate node by more than the threshold, setting the candidate node to a parent node of the candidate node.

8. The non-transitory computer-readable data storage medium of claim 1, wherein the unordered feature relatedness of the actions specifies an extent to which the features of the ordered steps of the actions are related to one another, not taking into account an order of the actions within the recorded test script.

9. The non-transitory computer-readable data storage medium of claim 8, wherein the actions are abstractedly related to one another to generate the abstracted actions in that the actions of a same type correspond to one abstracted action.

10. The non-transitory computer-readable data storage medium of claim 1, wherein generating the plurality of abstracted action groups comprises:
for each of one or more branches of the tree structure, generating an abstracted action group for the abstracted actions mapping to corresponding nodes of the branch.

11. The non-transitory computer-readable data storage medium of claim 1, wherein the features of the ordered steps comprise arguments and parameters of function calls, requests, and responses of the AUT to which the ordered steps correspond.

12. The non-transitory computer-readable data storage medium of claim 11, wherein the features are generated using one or more of:
a natural language processing (NLP) technique applied to the ordered steps;
a machine learning technique applied to the ordered steps or to graphical user interface (GUI) elements as to which the ordered steps are operative; and
a pattern recognition technique applied to user input corresponding to the ordered steps when the recorded test script was recorded.

13. The non-transitory computer-readable data storage medium of claim 1, wherein one or more of the feature relatedness of the ordered steps, the ordered feature relatedness of the actions, and the unordered feature relatedness of the ordered steps are determined using a cosine or other similarity measure of the ordered steps or the actions.

14. The non-transitory computer-readable data storage medium of claim 1, wherein one or more of the feature relatedness of the ordered steps, the ordered feature relatedness of the actions, and the unordered feature relatedness of the ordered steps are determined using a machine learning technique applied to the ordered steps or the actions.

15. The non-transitory computer-readable data storage medium of claim 3, wherein the new test script comprises user specification of a plurality of abstracted action group instantiations that each correspond to one of the abstracted action groups, testing the AUT in accordance with the new test script comprising:
replacing each abstracted action group instantiation with a plurality of abstracted action instantiations that each correspond to one of the abstracted actions of the abstracted action group to which the abstracted action group instantiation corresponds;
replacing each abstracted action instantiation with a plurality of test script steps encompassed by the abstracted action to which the abstracted action instantiation corresponds and populating the features into the test script steps in accordance with the abstracted action instantiation; and
executing the test script steps of the new test script to test the AUT.

16. The non-transitory computer-readable data storage medium of claim 15, wherein the abstracted actions with which each abstracted action group instantiation is replaced have the ordered feature relatedness in that the abstracted actions correspond to the actions having the features that are related to one another, taking into account an order in which the test script steps are performed.

17. The non-transitory computer-readable data storage medium of claim 15, wherein the abstracted action to which each abstracted action instantiation corresponds generalizes the actions as to the features.

18. The non-transitory computer-readable data storage medium of claim 17, wherein the actions that the abstracted action generalizes have a non-ordered featured relatedness in that the actions have the features that are related to one another, not taking into account an order in which the test script steps are performed.

19. The non-transitory computer-readable data storage medium of claim 17, wherein the actions that the abstracted action generalizes are abstractedly related to one another in that the actions are of a same type.

20. The non-transitory computer-readable data storage medium of claim 15, wherein the test script steps encompassed by the abstracted action to which each abstracted action corresponds have a feature relatedness in that the features are related to one another by more than a threshold feature relatedness.

* * * * *